United States Patent [19]
Bulst et al.

[11] Patent Number: 5,910,779
[45] Date of Patent: Jun. 8, 1999

[54] RADIO SCANNING SYSTEM USING ACOUSTICAL SURFACE WAVES (SW RADIO SCANNING SYSTEM)

[75] Inventors: Wolf-Eckhart Bulst, München; Clemens Ruppel, Kirchheim; Leonhard Reindl, Stephanskirchen, all of Germany; Franz Seifert, Vienna, Austria

[73] Assignee: Siemens Aktiengesellschaft, Munich, Germany

[21] Appl. No.: 08/744,464

[22] Filed: Nov. 7, 1996

[30] Foreign Application Priority Data

Nov. 7, 1995 [DE] Germany .......................... 195 41 475

[51] Int. Cl.⁶ .................................................. H04Q 7/00
[52] U.S. Cl. ............................... 340/825.54; 340/825.31; 340/539
[58] Field of Search .................. 340/825.54, 825.31, 340/825.34, 825.08, 539

[56] References Cited

U.S. PATENT DOCUMENTS

| | | | |
|---|---|---|---|
| 3,985,968 | 10/1976 | Stelzenmuller et al. | 370/479 |
| 4,245,333 | 1/1981 | Jelks | 367/121 |
| 4,924,449 | 5/1990 | Guigne | 367/104 |
| 4,945,354 | 7/1990 | McColl | 340/825.31 |
| 4,980,680 | 12/1990 | Knoll et al. | 340/825.31 |
| 4,994,798 | 2/1991 | McColl | 340/825.54 |
| 5,023,608 | 6/1991 | McColl | 340/825.31 |
| 5,115,160 | 5/1992 | Knoll et al. | 340/825.31 |
| 5,241,923 | 9/1993 | Janning | 340/573 |

FOREIGN PATENT DOCUMENTS 42 00 076  8/1993  Germany .
42 17 049  11/1993  Germany .

*Primary Examiner*—Edwin C. Holloway, III
*Assistant Examiner*—Edward Merz
*Attorney, Agent, or Firm*—Herbert L. Lerner; Laurence A. Greenberg

[57] ABSTRACT

A radio scanning system using acoustical surface waves (SW radio scanning system) includes a transceiver unit and sensor elements defining at least one parameter to be scanned. The transceiver unit has a transmitter transmitting question signals to the sensor elements and a receiver receiving and evaluating answer signals transmitted back by the sensor elements. The transmitter and the sensor elements are constructed in such a way that the question signals and the answer signals are chronologically inverse to one another. The sensor elements have different SW transit times.

5 Claims, 2 Drawing Sheets

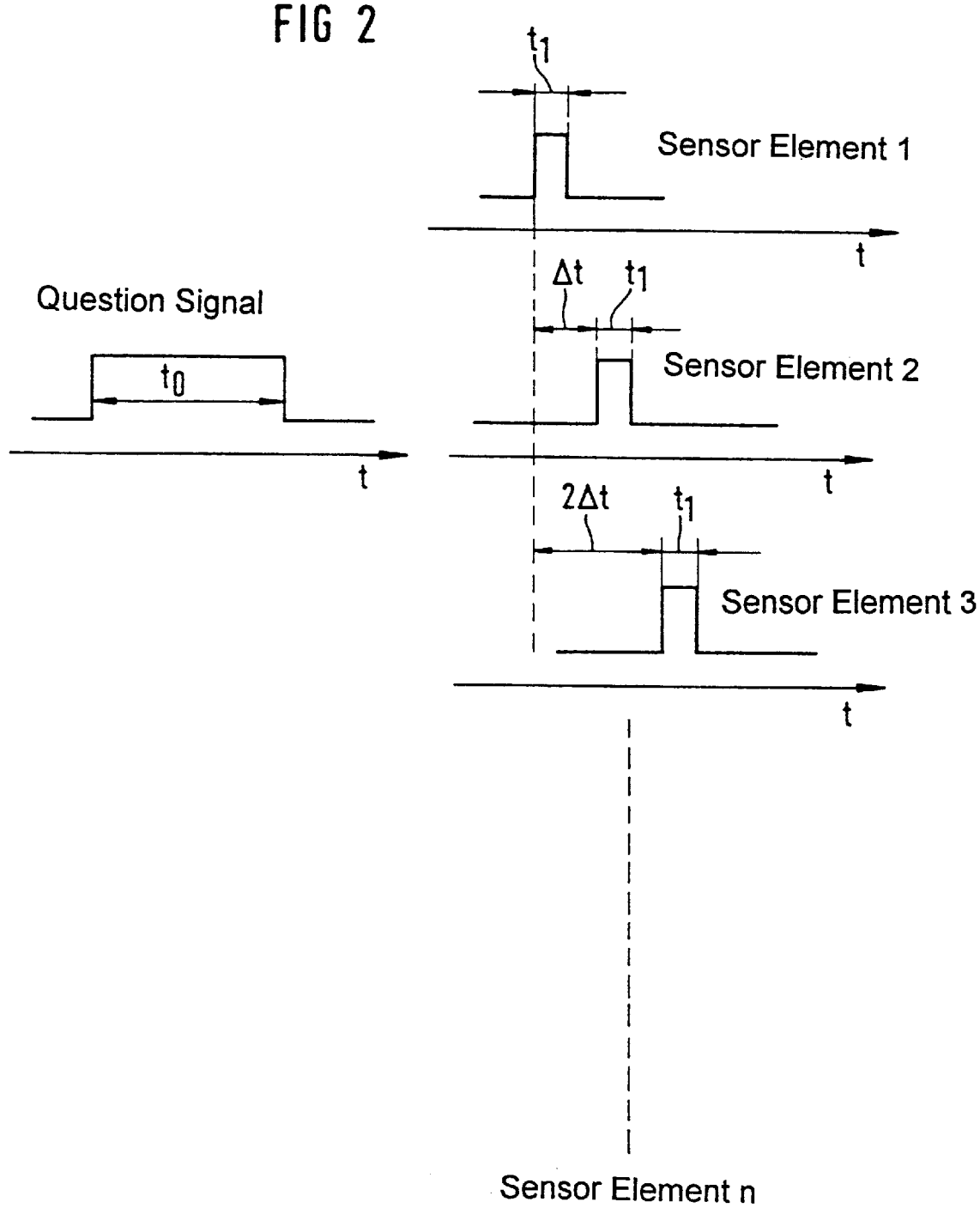

RADIO SCANNING SYSTEM USING ACOUSTICAL SURFACE WAVES (SW RADIO SCANNING SYSTEM)

BACKGROUND OF THE INVENTION

FIELD OF THE INVENTION

The present invention relates to a radio scanning system using acoustical surface waves (SW radio scanning system), having a transceiver unit and sensor elements that define at least one parameter to be scanned, a transmitter in the transceiver unit transmitting question signals to the sensor elements, and a receiver in the transceiver unit receiving and evaluating answer signals transmitted back by the sensor elements.

Such radio scanning systems are known, for instance, from German Published, Non-Prosecuted Patent Application DE 42 17 049 A1, corresponding to U.S. application Ser. No. 08/270,931, filed Jul. 5, 1994. Such a system includes at least one passive SW sensor for measured-value determination. A measured value is forwarded by radio from a remote measurement location to a scanner, which transmits a question pulse to the sensor element by radio energy. The SW sensor is suitable for contactless measured-value detection. Besides the SW sensor element, an SW reference element is provided for phase discrimination and/or transit time measurement. It can also be learned from the aforementioned patent application that chirped transmission and answer signals can also be used.

If a plurality of sensor elements are spatially dispersed within such a system, then the receiver must be capable of distinguishing, in a central transceiver unit, between the answer signals of the various sensor elements. That can be attained in a manner which is known per se by assigning each sensor element a specific code sequence, that is transmitted by the transmitter in succession in the central transceiver unit, so that after the SW transit time, the autocorrelation peak of the scanned sensor element is transmitted, as the answer signal of that sensor element, to the receiver in the transceiver unit. However, evaluating that correlation peak is made difficult because at the same time cross-correlation signals from all of the other sensor elements arrive in the form of background signals. Since in practice the spatial distribution of the sensor elements is uneven, the cross-correlation signal of a sensor element near the transceiver unit can be stronger than the autocorrelation signal of the more-remote sensor element that is being addressed, and can prevent the evaluation of the latter.

SUMMARY OF THE INVENTION

It is accordingly an object of the invention to provide a radio scanning system using acoustical surface waves (SW radio scanning system), which overcomes or minimizes the hereinafore-mentioned disadvantages of the heretofore-known devices of this general type and which makes virtually simultaneous evaluation of all sensor elements possible.

With the foregoing and other objects in view there is provided, in accordance with the invention, a radio scanning system using acoustical surface waves (SW radio scanning system), comprising a transceiver unit and sensor elements defining at least one parameter to be scanned; the transceiver unit having a transmitter transmitting question signals to the sensor elements and a receiver receiving and evaluating answer signals transmitted back by the sensor elements, the transmitter and the sensor elements being constructed in such a way that the question signals and the answer signals are chronologically inverse to one another; and the sensor elements having different SW transit times.

In accordance with another feature of the invention, the question signals are chirp signals.

In accordance with a further feature of the invention, the question signals are pulse-coded signals.

In accordance with an added feature of the invention, the question signals are generated by wavelet transformation processing.

In accordance with a concomitant feature of the invention, the transceiver unit has a plurality of spatially differently located reversible antennas for scanning spatially differently located sensor elements.

Other features which are considered as characteristic for the invention are set forth in the appended claims.

Although the invention is illustrated and described herein as embodied in a radio scanning system using acoustical surface waves (SW radio scanning system), it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a group of timing diagrams of question signals and answer signals that occur in the system of FIG. 1.

DESCRIPTION OF THE PREFERRED EMBODIMENTS

Figure 1:
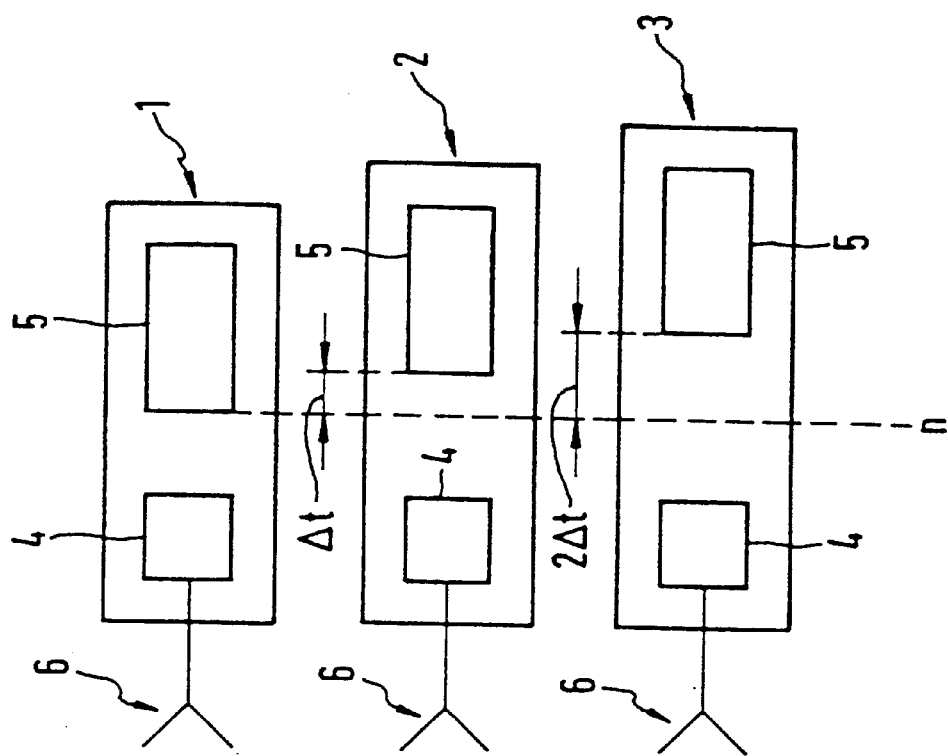
FIG. 1 is a generalized block circuit diagram of a radio scanning system according to the invention.
Figure 1:
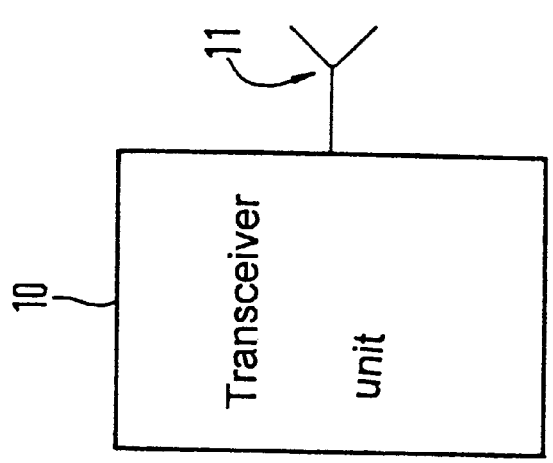

Referring now to the figures of the drawings in detail and first, particularly, to FIG. 1 thereof, there is seen a radio scanning system that has a transceiver unit 10 which transmits question or polling signals from a transmitter contained in it to sensor elements 1, 2, 3, . . . , n through an antenna 11, receives answer signals from these sensor elements through the antenna 11 and evaluates them in a receiver. The transceiver or transmitting/receiving unit 10 may be constructed in a manner that is essentially known per se, for instance as described in the aforementioned German Published, Non-Prosecuted Patent Application DE 42 17 049 A1, corresponding to U.S. application Ser. No. 08/270, 931, filed Jul. 5, 1994.

The sensor elements 1, 2, 3, . . . , n each receive the question signals from the transceiver unit 10 through a respective antenna 6, from which the answer signals are then broadcast to the transceiver unit 10 as well. In general, the sensor elements 1, 2, 3, . . . , n each contain one transducer 4, that converts electrical signals received through the antenna 6 into an acoustical surface wave. After a predetermined transit time the acoustical surface wave reaches a reflector 5 and is reflected by it back to the transducer 4. The transducer 4 converts this back-reflected acoustical surface wave back into an electrical signal, which as already noted above is broadcast through the antenna 6.

Both the transceiver unit 10 and the sensor elements 1, 2, 3, . . . , n are constructed according to the invention in such a way that the question signals of a sensor, which is not shown separately in FIG. 1, and the answer signals of the sensor elements, are chronologically inverse to one another, and that the sensor elements have different SW transit times. This subject matter is illustrated in detail in the timing diagrams of FIG. 2. In these diagrams, the aforementioned signals are plotted as a function of time t.

The transceiver unit 10 sends a question signal having a duration $t_0$. The question signal is a spread-spectrum signal, such as a chirp signal or a pulse code modulation signal. The pulse having the pulse length $t_0$ shown in FIG. 2 represents an envelope curve of the spread-spectrum question signal.

The sensor elements 1, 2, 3, . . . , n convert each question signal into a respective answer pulse signal of duration $t_1$. This duration $t_1$ is short, as compared with the pulse length $t_0$ of the question signal. This is due to the chronologically inverse structure of the radio scanning or polling system of the invention. The pulse compression in the sensor elements 1, 2, 3, . . . , n can be accomplished, for instance, by constructing them as matched-filter elements.

Due to the different SW transit times, as provided according to the invention, in the sensor elements 1, 2, 3, . . . , n, the pulsed answer signals are staggered timewise from one another, so that the sensor elements can still be distinguished from one another, even in simultaneous scanning. If the SW transit times are the same, the result with respect to the pulsed answer signal of the sensor element 1 is a timing offset of $\Delta t, 2\Delta t \ldots (n-1)\Delta t$, respectively. Due to this timing offset, all of the sensor elements can be constructed with the same code function. The amplitude of the pulsed answer signals or of the autocorrelation peaks depends on the distance between the transceiver unit 10 and the various sensor elements 1, 2, 3, . . . , n, as well as on the sensor size relative to the question signal.

In order to compensate for various-sized amplitudes of the answer signals, a plurality of spatially dispersed antennas 11 can be provided for the transceiver unit, and these antennas are automatically switched over so that small amplitudes of the answer signals can be increased through the use of shorter transmission paths.

According to a further feature of the invention, wavelet transformation processing can be provided in order to generate the question signals in the transceiver unit 10. It is thus possible to take external factors affecting the sensor elements, such as deformations caused by temperature or by mechanical strain, into account. Deformation of the sensor elements causes a time shift in the pulsed answer signals. The amplitude of these signals is maximal whenever the chronologically inverse question signal agrees, both in terms of the mean frequency and in terms of the transit time duration in the particular sensor element, with the lateral course of the question signal being varied by external influence on the sensor element. If an identical or homogeneous deformation occurs over the entire length of the particular sensor element, then the ratio of the signal period (which is the inverse of the mean frequency) to the transit time of the particular sensor element is the same for all of the sensor elements, and therefore the form of the answer signals remains unchanged. In the case of digital synthesis of the question signal for various sensor sizes, or in other words for various time scales, the sensor form is stored once and for all in memory and is read out at different clock frequencies.

According to a particular feature of the invention, the question signal is varied in increments over the range of time scaling or clock frequency that is covered by all of the sensor elements. With each increment, a different distribution of the amplitudes of the answer signals or correlation peaks is created. The time scaling values that correspond to the deformations caused by external factors (temperature deformation or mechanical deformation) can be derived from this, through the use of a digital comparison circuit. In these values, the amplitude of the particular answer signal or correlation peak reaches its maximum.

We claim:

1. A radio scanning system using acoustical surface waves (SW radio scanning system), comprising:

a transceiver unit and sensor elements defining at least one parameter to be scanned;

said transceiver unit having a transmitter transmitting question signals to said sensor elements and a receiver receiving and evaluating answer signals transmitted back by said sensor elements, the question signals and the answer signals being made chronologically inverse to one another by said transmitter and said sensor elements; and said sensor elements having different SW transit times.

2. The radio scanning system according to claim 1, wherein the question signals are chirp signals.

3. The radio scanning system according to claim 1, wherein the question signals are pulse-coded signals.

4. The radio scanning system according to claim 1, wherein the question signals are generated by wavelet transformation processing.

5. The radio scanning system according to claim 1, wherein said transceiver unit has a plurality of spatially differently located reversible antennas for scanning spatially differently located sensor elements.

\* \* \* \* \*